Oct. 24, 1933.    W. W. TUCK    1,931,636
APPARATUS FOR CONDUCTING CATALYTIC REACTIONS
Filed Dec. 30, 1930    2 Sheets-Sheet 2
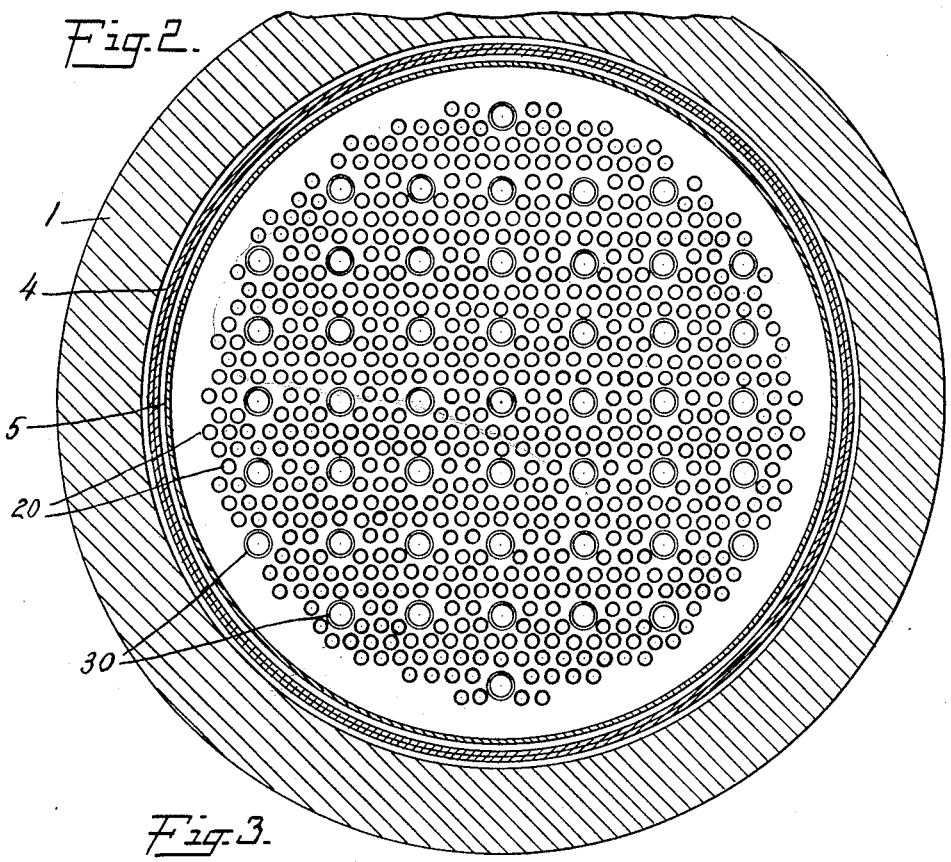
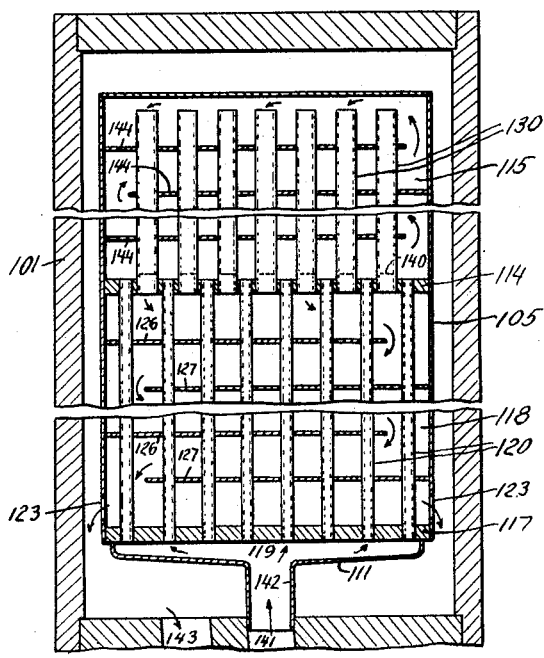
INVENTOR
William W. Tuck
BY
ATTORNEY Patented Oct. 24, 1933

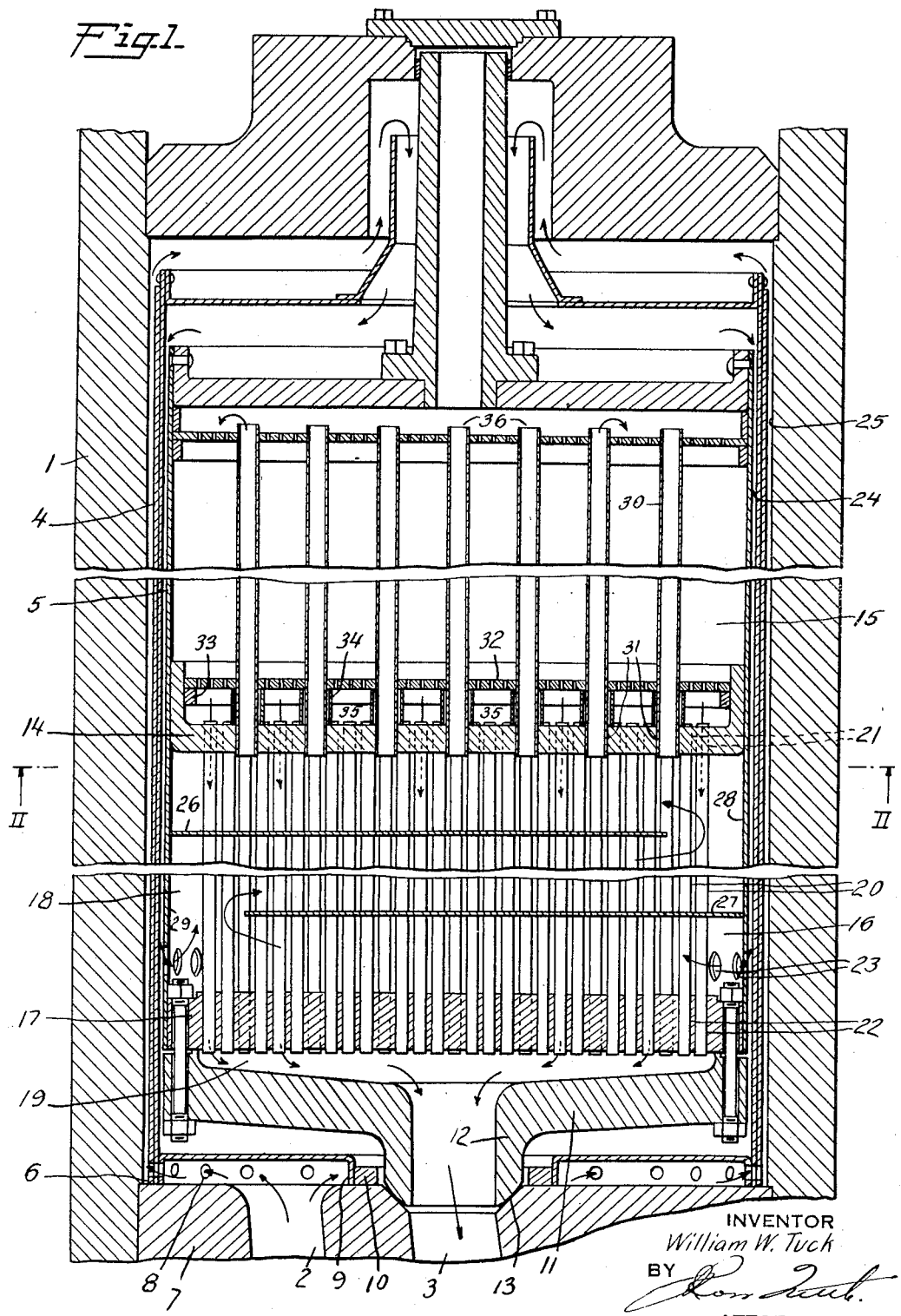

1,931,636

UNITED STATES PATENT OFFICE 1,931,636

APPARATUS FOR CONDUCTING CATALYTIC REACTIONS

William W. Tuck, Colonial Heights, Va., assignor to Atmospheric Nitrogen Corporation, New York, N. Y., a corporation of New York Application December 30, 1930
Serial No. 505,639

8 Claims. (Cl. 23—289)

This invention relates to an apparatus for conducting catalytic reactions. More particularly, this invention relates to an apparatus for carrying out exothermic catalytic reactions of the type of the synthetic production of ammonia wherein the incoming gases on their way to catalysis are first heated by passing in heat exchange relation with the exit gases from the catalyst and the thus heated gases pass first through and in heat exchange relation with the catalyst body and thence into direct contact therewith.

It has been proposed to carry out synthetic gas reactions such as the synthesis of ammonia employing a catalyst container of the shell and tube type wherein a heat interchange section and a catalyst containing section are combined within a single shell. An apparatus of this type is disclosed in the copending U. S. patent application, Serial No. 660,532, filed September 1, 1923, by Walter H. Kniskern.

It is an object of this invention to provide a new and improved catalyst converter of the shell and tube type, in which a heat interchange section and a catalyst containing section are combined within a single shell, which is relatively inexpensive to manufacture and contains comparatively few joints which are susceptible to leakage under the fluctuating temperature conditions to which apparatus of this type is exposed in operation. Other objects of the invention will in part be obvious and will in part appear hereinafter.

The apparatus of this invention comprises in combination in a shell and tube heat interchanger and catalyst container, a tube sheet wherein are secured both a plurality of heat exchange tubes comprised in the heat interchanger and a plurality of heat exchange tubes comprised in the catalyst container, each of the tubes of one of the sets having one end secured in the tube sheet.

For a fuller understanding of the nature and objects of the invention, reference should be had to the following detailed description taken in connection with the accompanying drawings, in which Fig. 1 is a diagrammatic drawing of an ammonia synthesis converter illustrative of this invention;

Fig. 2 is a view, partly in cross section and partly in plan, of the apparatus of Fig. 1 along line II—II; and Fig. 3 is a diagrammatic sketch of a modification of the apparatus of this invention.

Referring to Figs. 1 and 2, the numeral 1 indicates a pressure vessel having pressure-sustaining walls provided with a gas inlet 2 and a gas outlet 3 in the lower closure 7 of vessel 1. Within vessel 1 and spaced from the walls thereof is a mantle 4 surrounding a shell 5. The bottom flange 6 of mantle 4 rests upon the lower closure 7 of vessel 1 and is provided with apertures 8. A central bottom flange 9 of mantle 4 is provided with a sealing ring 10 which prevents the passage of gas past flange 9. The lower head 11 forming the bottom of shell 5, is provided with a gas exit tube 12 which communicates with gas outlet 3 through a gas tight joint 13. Within shell 5 and at an intermediate portion thereof there is fixed a tube sheet 14 which serves to divide the interior of the shell into two portions, an upper catalyst containing section 15 and a lower heat interchange section 16. Within the lower portion of shell 5 and adjacent to the head 11, is a second tube sheet 17 which divides the lower portion of the interior of the shell into a heat interchange chamber 18 and a gas collecting chamber 19. A plurality of heat exchange tubes 20 transverse the heat interchange chamber and each has its opposite ends 21 and 22 respectively secured in each of tube sheets 14 and 17. Shell 5 is provided with apertures 23 which serve as gas inlets to the interior of heat interchange chamber 18 communicating with gas inlet 2 of pressure vessel 1 by way of the space 24 between mantle 4 and shell 5 and the space 25 between mantle 4 and the walls of pressure vessel 1 and apertures 8 in flange 6. The interior of heat interchange chamber 18 is provided with a plurality of baffles 26 and 27. Baffles 26 are spaced from one side 28 of shell 5 and alternate with baffles 27 which are spaced from the opposite side 29 of the shell so as to provide a tortuous passage way for gas entering heat interchange chamber 18 through inlets 23 and passing upwardly therethrough in the direction indicated by the arrows.

Within the catalyst containing section 15 of shell 5 there is a second plurality of heat exchange tubes 30, each of which has an end 31 secured in tube sheet 14 and spaced therein from the ends 21 of tubes 20. The interiors of tubes 30 are in communication with the interior of heat exchange chamber 18. Tubes 30 extend upwardly within catalyst containing section 15 away from tube sheet 14 in the opposite direction from that in which tubes 20 extend therefrom. Within shell 5 above tube sheet 14 a foraminous catalyst support 32 rests upon a supporting ring 33 and is spaced from tube sheet 14 by means of spacers 34. Catalyst support 32 with tube sheet 14 and a portion of the walls of shell 5, forms a gas collecting chamber 35. Tubes 30 transverse collecting chamber 35, pass through catalyst support 32 and extend within the upper portion of the interior shell 5 and terminate therein in open ends 36.

In employing the apparatus described for the synthesis of ammonia, an ammonia catalyst is filled into the spaces about tubes 30 and rests upon catalyst support 32. A nitrogen-hydrogen gas, which may be preheated to a desired degree, enters pressure vessel 1 through gas inlet 2 and passes through apertures 8, upwardly through space 25, downwardly through space 24 and enters the heat exchange chamber in the bottom portion of the interior of shell 5 through gas inlets 23. The gas follows the circuitous passageway about baffles 26 and 27 in contact with heat exchange tubes 20. It then enters and passes through tubes 30 and thence from the open ends 36 of these tubes into direct contact with the catalyst between the tubes. The gas passes downwardly in contact with the catalyst and thence through the openings in catalyst support 32 into gas collecting chamber 35. From this gas collecting chamber the synthesized gases pass through tubes 20 to gas collecting chamber 19 and thence out of shell 5 and pressure vessel 1 through gas exit tube 12 and gas outlet 3. During the passage of the gases in heat exchange relationship with each other in heat interchange section 16, the incoming gas is heated by transferring thereto heat contained in the exit gas passing through tubes 20. The thus preheated gas passing through tubes 30 serves to remove heat from the body of catalyst surrounding the tubes whereby the incoming gas is heated to the desired degree and the catalyst maintained at efficient operating temperatures.

Fig. 3 is a diagrammatic drawing of a modification of the apparatus of this invention wherein the catalyst material is contained within a plurality of tubes about which the synthesis gas passes prior to direct contact with the catalyst. In that drawing a shell 105 corresponds to shell 5 of the apparatus of Fig. 1. Tube sheets 114 and 117 correspond respectively to tube sheets 14 and 17 of Fig. 1. A plurality of heat exchange tubes 120 have their opposite ends secured in tube sheets 114 and 117. A second plurality of heat exchange tubes 130 have one end of each tube secured in tube sheet 114, spaced therein from the ends of tubes 120 and extend upwardly within a catalyst containing section 115. A screen 140 is secured in the lower end of each of tubes 130. Tube sheet 117 is spaced from the bottom closure 111 of sheet 105 to provide a gas distributing chamber 119. An inlet 141 communicates through tube 142 with chamber 119 and an outlet 143 communicates by way of the space between the walls of the pressure vessel 101 and shell 105 and outlets 123 with the interior of a heat exchange chamber 118 formed by tube sheets 114 and 117 and the walls of shell 105. Within chamber 118 two sets of baffles 126 and 127 define a tortuous gas passage traversing the chamber. Catalyst containing section 115 may likewise be provided with baffles 144 defining a tortuous gas passage communicating between the ends of tubes 120 and of tubes 130.

In employing the apparatus shown in Fig. 3 for the synthesis of ammonia, an ammonia catalyst is filled into tubes 130 and rests therein upon screens 140. A nitrogen-hydrogen gas, preheated to a desired temperature, passes through inlet 141 into chamber 119 and thence through tubes 120 and into the space about tubes 130 in the upper catalyst container portion of shell 105. The gas passes upwardly through the passage about tubes 130 defined by baffles 144 and then enters the open tops of these tubes and passes downwardly therethrough and in direct contact with the catalyst. From tubes 130 the synthesized gas passes into heat exchange chamber 118 and through the circuitous passage way therein defined by baffles 126 and 127 to the outlets 123 and thence to outlet 143. The incoming gas on its way to contact with the catalyst is heated in heat exchange tubes 120 by transfer of heat thereto from the hot synthesis gases passing about these tubes. The thus preheated gas passes in indirect heat exchange relation with the catalyst in tubes 130 and then into direct contact with the catalyst contained therein.

The apparatus described above has important advantages over shell and tube converters heretofore employed for conducting catalytic reactions. By employing a single tube sheet between the heat exchange and catalyst containing sections, the construction of the apparatus is simplified and made less costly. At the same time, this invention provides a rugged apparatus having a minimum of joints subjected to relatively large stresses and strains while in use and hence reduces the danger of joints opening up and allowing gas to leak through.

It is apparent that the accompanying figures are diagrammatic representations of apparatus embodying this invention and that numerous modifications and details of construction thereof will be readily apparent to one skilled in the art. For example, it may be desired to insert core rods into tubes 20 and/or tubes 30. The mantle 4 of the apparatus shown in Fig. 1 may be dispensed with and the incoming gas passed directly into shell 5. It is likewise evident that if this invention is employed for carrying out reactions at ordinary pressures, the outer pressure vessel 1 may be dispensed with and the gas to be treated passed directly into shell 5.

Since certain changes may be made in the construction described in detail above and different embodiments of the invention can be made without departing from the scope thereof, it is intended that all matter contained in the above description or shown in the accompanying drawings shall be interpreted as illustrative and not in a limiting sense.

I claim:

1. In combination in a shell and tube catalyst container comprising a catalyst containing section and a heat interchanger section, a tube sheet, a plurality of heat exchange tubes each having an end secured in said tube sheet and extending therefrom within the heat interchanger section and a second plurality of heat exchange tubes each having an end secured in said tube sheet, and extending therefrom within said catalyst containing section.

2. In combination in a catalyst container a shell, a tube sheet within said shell dividing the interior thereof into a catalyst containing section and a heat interchanger section, a plurality of heat exchange tubes each having an end secured in said tube sheet and extending therefrom within the heat exchange section, gas conducting means communicating with the interior of the heat exchange section about the tubes therein, gas conducting means communicating with the interior of said tubes, and a second plurality of heat exchange tubes each having an end secured in said tube sheet, spaced therein from the ends of the aforesaid plurality of tubes, and extending from the tube sheet within said catalyst containing section.

3. In combination in a catalyst container a shell, a tube sheet at an intermediate portion thereof dividing the interior of said shell into a catalyst containing section and a heat interchanger section, a second tube sheet within said heat interchanger section and spaced from the aforesaid tube sheet, a plurality of heat exchange tubes having their opposite ends secured in each of said tube sheets, means for introducing a gas into said heat interchanger section and about said tubes, means for passing gas from the interior of said tubes to the outside of said shell, a second plurality of heat exchange tubes each having an end secured in said first mentioned tube sheet and spaced therein from the ends of the aforesaid plurality of tubes, said last mentioned tubes extending from the tube sheet within said catalyst containing section and terminating therein in open ends.

4. In combination in a shell and tube catalyst container for the synthetic production of ammonia comprising a catalyst containing section and a heat interchanger section, a tube sheet separating said sections, a plurality of heat exchange tubes each having an end secured in said tube sheet and extending therefrom within said heat interchange section, gas conducting means communicating with the interior of said heat interchange section about the tubes therein, gas conducting means communicating with the interior of said tubes, and a second plurality of heat exchange tubes each having an end secured in said tube sheet, spaced therein from the ends of the aforesaid plurality of tubes, and extending from the tube sheet within said catalyst container section.

5. In combination in a catalyst container for the synthetic production of ammonia, a pressure vessel having pressure sustaining walls, a tube sheet therein, a plurality of heat exchange tubes each having an end secured in said tube sheet and extending therefrom, a second plurality of heat exchange tubes each having an end secured in said tube sheet and extending therefrom in the opposite direction from the first mentioned plurality of tubes, gas conducting means penetrating said pressure sustaining walls and communicating with the space about said first mentioned heat exchange tubes, and a second gas conducting means penetrating the pressure sustaining walls and communicating with the interior of said heat exchange tubes.

6. In combination in a catalyst container for the synthetic production of ammonia, a pressure vessel having pressure sustaining walls, a shell within said vessel, a tube sheet within said shell at an intermediate portion thereof dividing the interior of the shell into two portions, a second tube sheet within the lower portion of the shell, a plurality of heat exchange tubes having their opposite ends secured in each of said tube sheets, a second plurality of heat exchange tubes each of which has one end secured in the first mentioned tube sheet and spaced therein from the ends of the aforesaid plurality of tubes, said heat exchange tubes extending from said tube sheet within the upper portion of the interior of the shell and terminating therein in open ends, means for introducing gas to be synthesized into the pressure vessel and within the interior of the shell, and means for withdrawing synthesized gas from within said shell to the outside of the pressure vessel, said means communicating one with the interior of the shell between the aforesaid tube sheets and the other with the interiors of said first mentioned plurality of tubes.

7. In combination in a catalyst container for the synthetic production of ammonia, a pressure vessel having pressure sustaining walls provided with a gas inlet and a gas outlet, a shell within said vessel, a tube sheet within said shell at an intermediate portion thereof dividing the interior of the shell into two portions, a second tube sheet within the lower portion of the shell and adjacent to the bottom thereof dividing the lower portion of the interior of said shell into a heat interchange chamber and a gas chamber, a gas inlet and a gas outlet communicating one with said gas chamber and the other with the interior of said heat interchange chamber, a plurality of heat exchange tubes each of which transverses said heat exchange chamber and has its opposite ends secured in said tube sheets, and a second plurality of heat exchange tubes each of which has one end secured in the upper tube sheet and spaced therein from the ends of the aforesaid plurality of tubes, said heat exchange tubes extending from said tube sheet within the upper portion of the interior of the shell and terminating therein in open ends.

8. In combination in a catalyst container for use in the synthetic production of ammonia, a pressure vessel having pressure sustaining walls provided with a gas inlet and a gas outlet, a shell within said vessel, a tube sheet within said shell at an intermediate portion thereof dividing the interior of the shell into two portions, a second tube sheet within the lower portion of the shell and adjacent to the bottom thereof dividing the lower portion of the interior of the shell into a heat interchange chamber and a gas collecting chamber, a gas inlet communicating with the gas inlet of the pressure vessel and with the interior of said heat interchange chamber, a gas outlet communicating between said gas collecting chamber and the gas outlet of the pressure vessel, a plurality of heat exchange tubes each of which transverses said heat interchange chamber and has its opposite ends secured in each of said tube sheets, a foraminous catalyst support within the upper portion of the shell and spaced from the first mentioned tube sheet to provide a gas collecting chamber therebetween communicating with said plurality of tubes, a second plurality of heat exchange tubes, each of which has one end secured in said tube sheet and spaced therein from the ends of the aforesaid plurality of tubes, said heat exchange tubes transversing the last mentioned gas collecting chamber, extending within the upper portion of the interior of the shell and terminating therein in open ends.

WILLIAM W. TUCK.